Oct. 11, 1927.
L. BLACKMORE
1,644,707
DRIVE AXLE CONSTRUCTION
Filed April 11, 1923
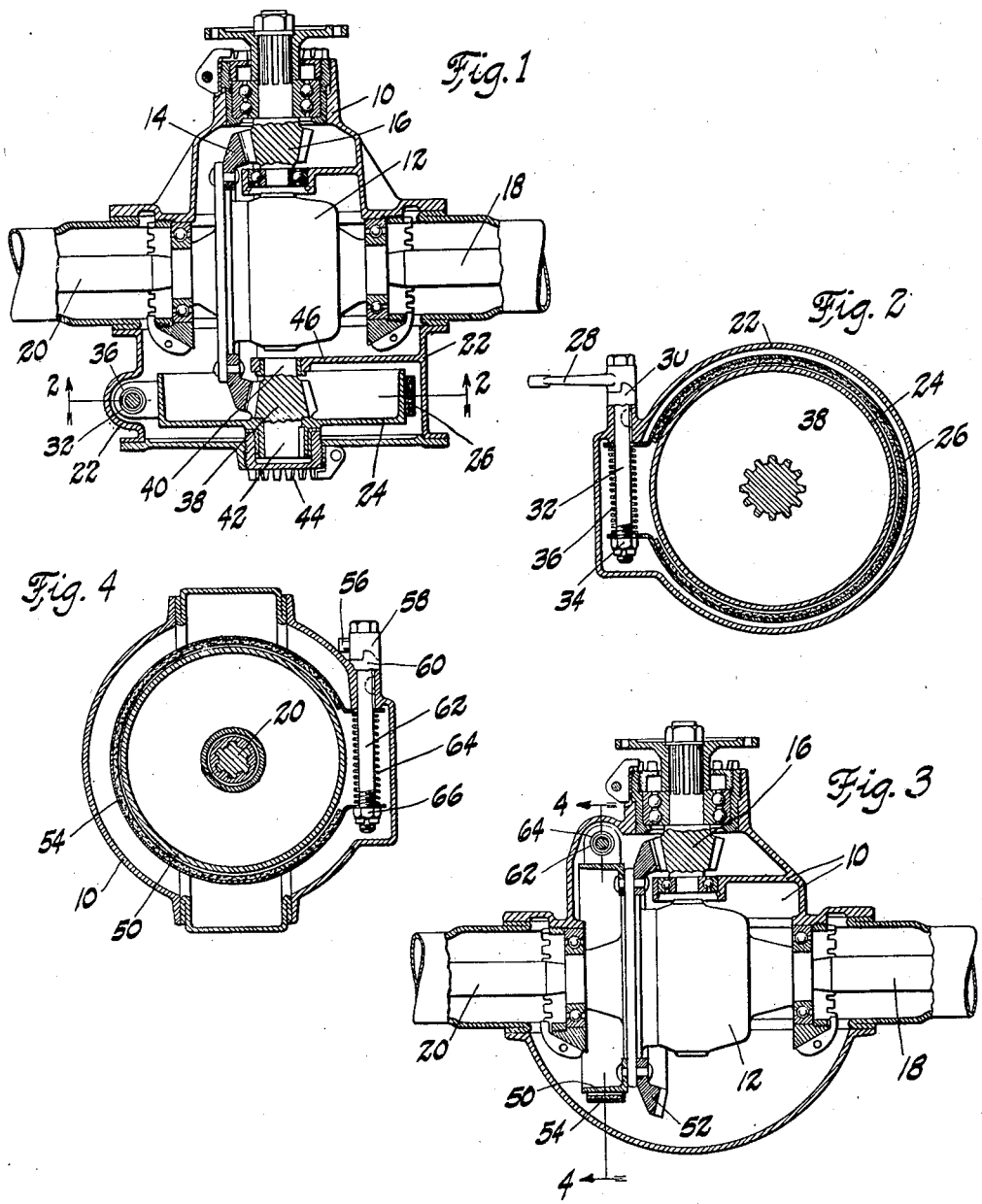
Inventor
Lloyd Blackmore Patented Oct. 11, 1927.

1,644,707

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

DRIVE AXLE CONSTRUCTION.

Application filed April 11, 1923. Serial No. 631,387.

This invention relates to drive axle constructions embodying braking or retarding means, and is illustrated as embodied in the rear axle of an automobile. An object of the invention is to provide retarding means operating on the differential device of such an axle, to eliminate the torque on the propeller shaft which is caused by the application of an ordinary transmission brake.

From this point of view the invention contemplates the provision in such a drive axle construction of driver-controlled means to exert a retarding or braking force on the drive axles through a differential device which connects and drives the axles. In one form the construction comprises a brake drum arranged to rotate with the differential device, together with braking means which exerts a retarding force on the differential device through the drum. In one desirable arrangement, the drum is fastened to the ring gear which meshes with the usual driving pinion and which rotates the differential device to drive the axles. In the illustrative embodiment of this modification of the invention, the retarding force is applied by an expansible and contractable band within the differential housing and which is operable by a connection such as a rock shaft extending through the housing.

Another modification of the invention contemplates the application of the retarding force to a drum which is arranged behind the differential device and at right angles to the plane of the ring gear, and which is geared to the ring gear to rotate therewith.

Another feature of novelty of the invention relates to the arrangement of the brake in a housing member as a self-contained unit so that it may readily be assembled in place or detached. This sort of construction is especially useful in making up a unit which is interchangeable with an ordinary cover member, as for example for the usual opening in the differential housing. Thus, for example, if an automobile is equipped with an efficient set of brakes, such as four-wheel brakes, arranged for service, and it becomes necessary to operate the automobile in one of the few States which have laws making two separate sets of brakes mandatory, the ordinary plain cover of the differential housing may be removed and the above described self-contained brake unit substituted therefor and connected to the emergency brake lever or a special controlling member.

The above and other features and objects of the invention, including various novel combinations of parts and desirable particular constructions, will be apparent from the following description of two illustrative embodiments of the invention shown in the accompanying drawings, in which:

Figure 1 is a horizontal sectional view through the differential gear mechanism and its housing, showing in horizontal section one form of brake;

Figure 2 is a section on the line 2—2 of Figure 1, showing the brake in vertical section;

Figure 3 is a view corresponding to Figure 1, but showing a modified form of brake; and Figure 4 is a section on the line 4—4 showing the brake of Figure 3 in vertical section.

In the modification shown in Figure 1, the differential gear housing 10 encloses the differential member 12 operated by a ring gear 14 driven by a pinion 16 and geared in the usual manner to live axles 18 and 20. The differential housing 10 has an opening in its rear side, to facilitate adjustment of the differential mechanism, and according to one feature of the invention this opening is closed by a cap or supplementary housing 22 carrying the brake. The particular form of brake illustrated in Figure 1 comprises a drum 24 encircled by a contractable band 26 operated by rocking an arm 28 (Figure 2) having a cam portion engaging a stationary cam portion 30 and connected to a shaft 32 carrying an adjustable nut 34 which pulls on one end of band 26 against the resistance of a spring 36. The arm 28 is operated by connections from the brake pedal or the emergency brake lever or an equivalent control member.

In order to transmit the retarding force of the brake to the rear wheels, the drum has formed integrally therewith or connected thereto a pinion 38 meshing with the ring gear 14 diametrically opposite the pinion 16. The pinion and drum are supported by a shaft, or by integral cylindrical projections 40 and 42, journaled in a bushing 44 threaded into an opening centrally of the back face of the supplementary housing 22, and in a bearing formed in a flange 46 extending from the side of the supplementary housing inside of pinion 38.

It will be seen by this arrangement that after the brake operating connections are disengaged from the arm 28, the entire brake assembly can be removed as a unit with the supplementary housing 22. It will also be seen that the retarding force of the brake operates through the ring gear 14 directly to the drive axles 18 and 20 without passing through the propeller shaft as with the usual transmission brake. By forming the device as a detachable unit as described, it may be made interchangeable with a plain cap member so that, for example, it may be placed on a car in lieu of such cap member for use in States requiring a brake which is entirely separate from the service brakes.

The modification shown in Figures 3 and 4 differs from that of Figures 1 and 2 in that the drum 50 is riveted or otherwise secured directly to the ring gear 52 corresponding to the ring gear 14 and operated in the same manner. The brake band 54 is contracted by rocking an arm 56 having a cam portion 58 engaging a stationary cam 60 and moving axially a shaft 62 against the resistance of a spring 64 so that the nut 66 contracts band 54 against the brake drum as explained above.

In the operation of this modification, the retarding force is transmitted directly to the ring gear which operates the drive axles 18 and 20 instead of to a drum which is geared to the ring gear as in the first modification. In both modifications, however, the retarding force acts on a member which is connected directly to the ring gear as distinguished from one which is connected to the ring gear through the propeller shaft as in an ordinary transmission brake. By this arrangement the propeller shaft is relieved of the braking torque (which is often much greater than the driving torque) so that the propeller shaft may be made that much lighter. Moreover, the braking action takes place through shorter connections, thus eliminating lost motion and the twisting or whipping action of the propeller shaft which is a characteristic of an ordinary transmission brake.

While two modifications of the invention have been illustrated and described it is not my intention to limit its scope to those modifications or otherwise than by the terms of the appended claims. The term "drum" as used in the specification and claims is intended, not as a limitation to any particular structure, but merely as a convenient designation for any member whose motion is to be retarded.

I claim:

1. A drive axle construction comprising, in combination, oppositely extending axles and housings therefor, a differential device driving said axles, a brake drum geared to the differential device on its rear side and arranged in a vertical plane parallel to the drive axles, a brake on said drum, and brake operating connections including a vertically reciprocable shaft terminating above the level of said axle housings to permit an operating device to extend forward above the housing.

2. A drive axle construction comprising, in combination, a differential device and a housing therefor having an opening, and a supplementary housing closing the opening and carrying as a unit a brake operable on the differential device.

3. Brake mechanism comprising, in combination, a rotatable member and a housing therefor having an opening, and a supplementary housing closing the opening and carrying as a unit a brake operable on the rotatable member.

4. A drive axle construction comprising, in combination, a differential device and a housing therefor having openings, the opening being constructed and arranged to be closed by either of two interchangeable members, one of which is a plain cover, and the other of which is a cover or supplementary housing carrying as a unit a brake constructed and arranged to operate on the differential device.

5. A cover for a differential housing which is interchangeable with a plain cover and a brake carried by said cover as a unit, said brake being constructed and arranged to be in operative engagement with a differential device when the cover is secured to a housing enclosing said device.

6. A self-contained brake unit comprising, in combination, a housing member, a brake drum rotatably mounted within said member, retarding means in operative relation to the brake drum, and operating connections for said means including an operating part on the exterior of the housing.

7. A self-contained brake unit comprising, in combination, a housing member, a brake drum rotatably carried within said member, an expansible and contractable band arranged to engage said drum, and operating connections for the band including a rock shaft extending through the housing member.

8. A brake unit comprising, in combination, a housing member 22 having an internal flange 46, a rotating brake drum within the housing member, bearings to support the brake drum formed in the flange and in the wall of said housing member, and retarding means operating on the brake drum including operating connections outside of the housing member.

9. The combination of a drive axle including a differential comprising a ring gear, a housing for the differential, a driving pinion extending within the housing for meshing with the ring gear, spaced journals within the housing, a stub shaft mounted in the journals and having a pinion thereon meshing with the ring gear, a drum mounted on said stub shaft between said journals, a brake on said drum, and means for operating the brake.

10. In the combination as defined in claim 9, said housing including a cover, and one of said journals being mounted in the cover.

In testimony whereof I affix my signature.

LLOYD BLACKMORE.